(12) United States Patent
Lee

(10) Patent No.: US 7,784,075 B2
(45) Date of Patent: Aug. 24, 2010

(54) TELEVISION DISTRIBUTION SYSTEM AND PROCESSING UNIT USED IN SAID DISTRIBUTION SYSTEM

(75) Inventor: Henri Lee, Villiers sur Morin (FR)

(73) Assignee: Casanova, Champs sur Marne (FR)

( * ) Notice: Subject to any disclaimer, the term of this patent is extended or adjusted under 35 U.S.C. 154(b) by 1272 days.

(21) Appl. No.: 10/529,053

(22) PCT Filed: Sep. 24, 2002

(86) PCT No.: PCT/FR02/03259

§ 371 (c)(1),
(2), (4) Date: Oct. 28, 2005

(87) PCT Pub. No.: WO03/028369

PCT Pub. Date: Apr. 3, 2003

(65) Prior Publication Data

US 2006/0143663 A1      Jun. 29, 2006

(30) Foreign Application Priority Data

Sep. 25, 2001   (FR) .................................. 01 12533

(51) Int. Cl.
*H04N 7/08* (2006.01)
*H04M 11/00* (2006.01)
(52) U.S. Cl. ........................ 725/78; 379/93.07; 725/151
(58) Field of Classification Search ................... 725/151
See application file for complete search history.

(56) References Cited

U.S. PATENT DOCUMENTS 5,130,793 A    7/1992  Bottin et al.

5,633,614 A *  5/1997  Decramer .................... 333/25
5,775,927 A *  7/1998  Wider ........................ 439/188
5,901,340 A *  5/1999  Flickinger et al. ........... 725/149

(Continued)

FOREIGN PATENT DOCUMENTS

EP          0 329 912 A      8/1989

(Continued)

OTHER PUBLICATIONS

Patent Abstract of Japan vol. 2000, No. 10, Nov. 17, 2000 & JP 2000 188153 S (Matsushita Electric Works Ltd.) Jul. 4, 2000.

*Primary Examiner*—Brian T Pendleton
*Assistant Examiner*—Jean D Saint Cyr
(74) *Attorney, Agent, or Firm*—Sughrue Mion, PLLC

(57) ABSTRACT

The invention concerns a system for distribution of television-type (TV) video signals comprising: a first input processing unit (1) including a coaxial input terminal (10), at least a low-current output terminal (11) for twisted wire pairs and processing means (14) for processing the TV signals derived from the coaxial cable so as to transform them into signals having substantially the same transmission characteristics on the same frequency band on a twisted wire pair, at least a second output processing unit (3) including a low-current input port (33) for twisted wire pairs (12) connected to the first input processing unit (1) to transform them into signals substantially identical to those derived from said coaxial cable (41), and at least a connection cable (23) consisting of twisted wire pairs connecting the first processing unit (1) to the second processing unit (3).

18 Claims, 2 Drawing Sheets

U.S. PATENT DOCUMENTS

Figure 1:
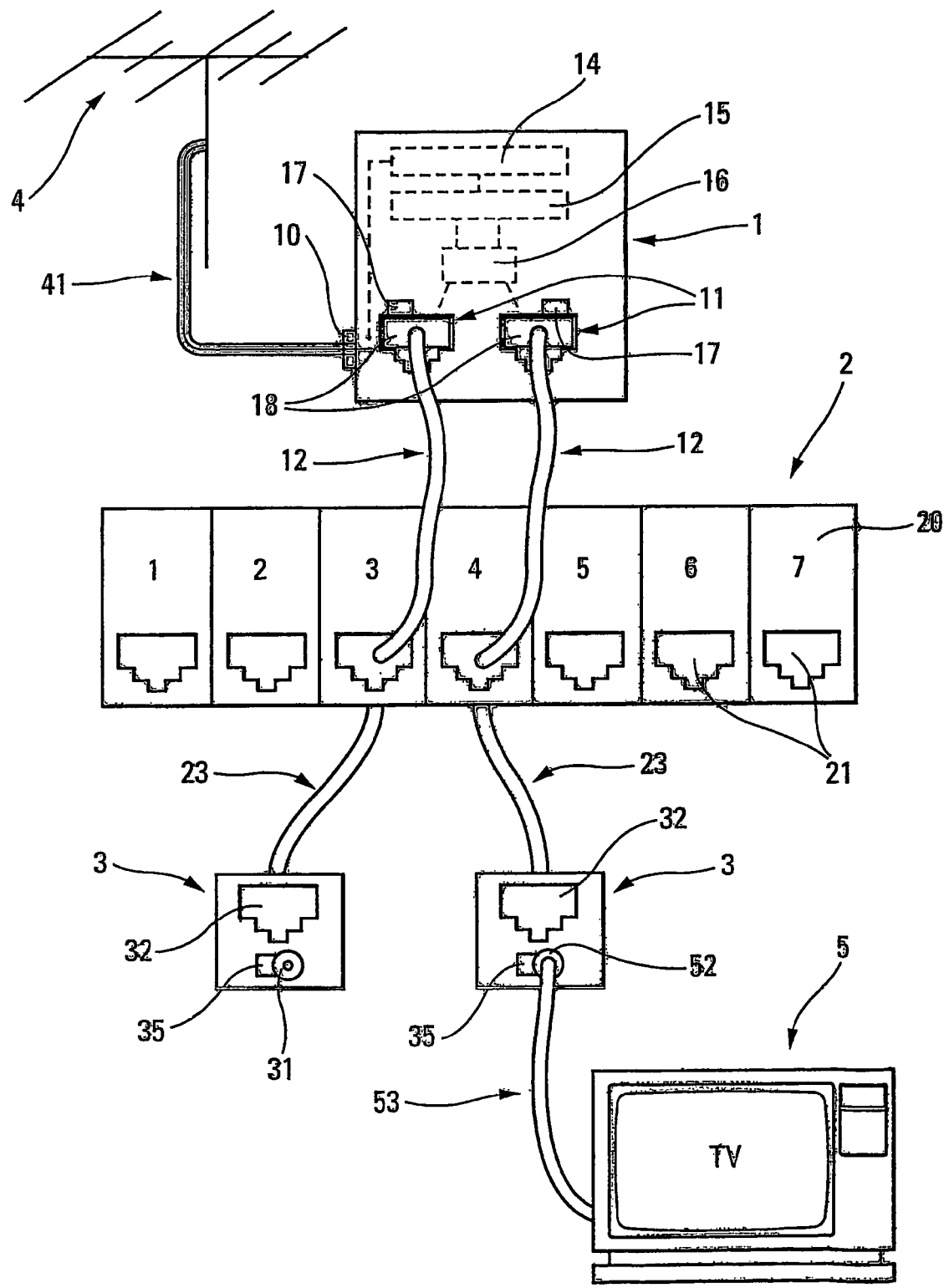

| | | | |
|---|---|---|---|
| 5,950,111 A * | 9/1999 | Georger et al. | 455/3.01 |
| 6,150,896 A * | 11/2000 | DeCramer et al. | 333/25 |
| 6,323,427 B1 * | 11/2001 | Rutledge | 174/113 R |
| 6,901,340 B1 * | 5/2005 | Pasadyn et al. | 702/84 |
| 2002/0083475 A1 * | 6/2002 | Hennenhoefer et al. | 725/147 |
| 2005/0149984 A1 * | 7/2005 | Goodman et al. | 725/128 |

FOREIGN PATENT DOCUMENTS

| | | |
|---|---|---|
| EP | 1 061 741 A | 12/2000 |
| WO | WO 01 69925 A | 9/2001 |

* cited by examiner

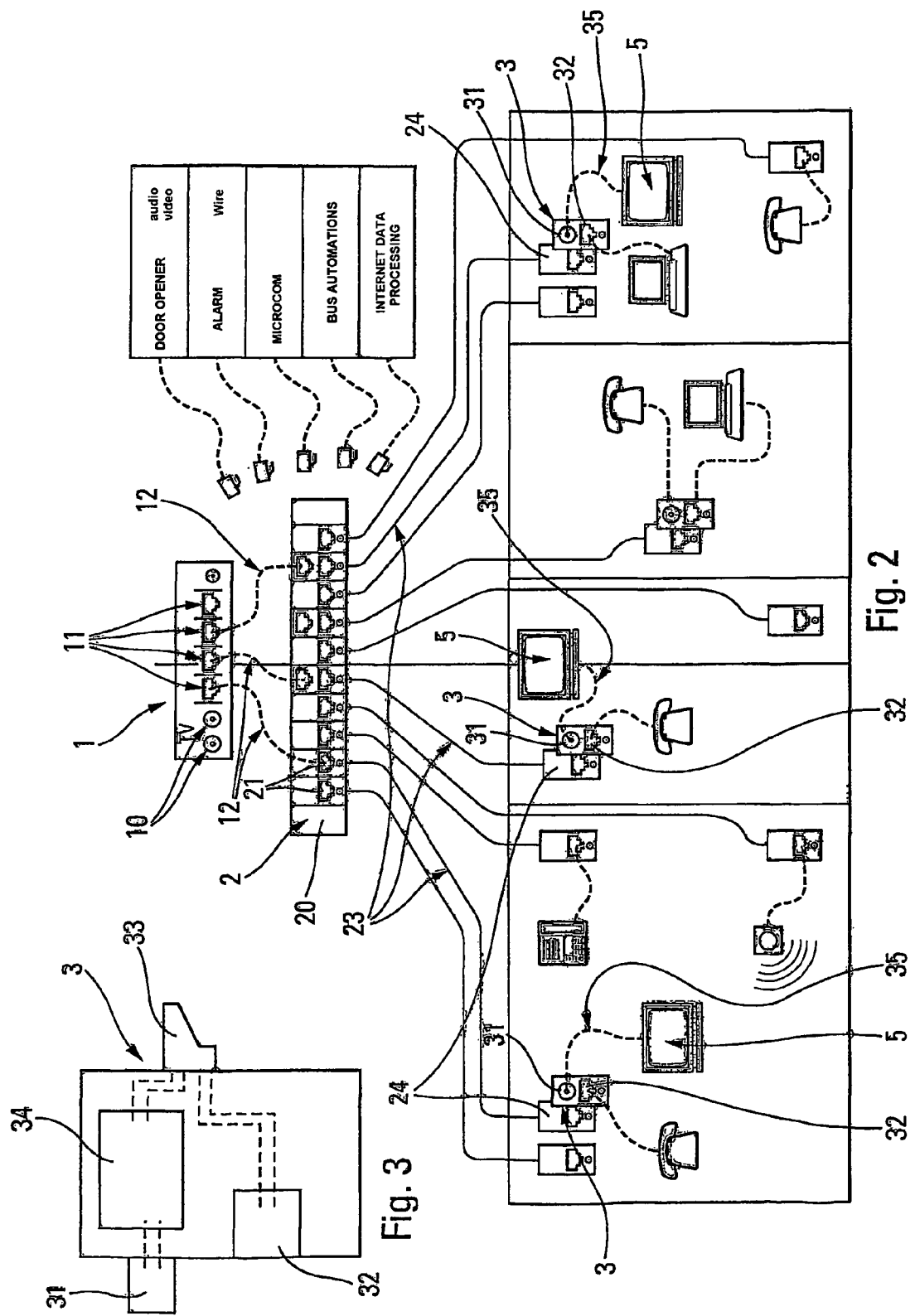

TELEVISION DISTRIBUTION SYSTEM AND PROCESSING UNIT USED IN SAID DISTRIBUTION SYSTEM

This invention relates to a system for distribution of television type video signals that we will denote under the general term of TV signals. The term TV signals implies qualitative criteria essential for acceptable viewing by sets used by the general public. The invention also relates to a signal processing unit used in the distribution system according to the invention.

The usual and conventional method for the transmission of TV signals is to use coaxial cables that are capable of transmitting TV signals corresponding to these criteria over a band width conventionally varying from 5 to 862 MHz. This pass band is composed of two sets:

a down channel that carries video signals to the television set (86 to 862 MHz), an up channel (5 to 65 MHz), more commonly called a "return channel" that enables interactivity of services proposed by a network operator, if any (Internet, telephony, online services).

Normally, the cable output from the antenna or the cable television network is connected directly to the television set.

The distribution system according to this invention is integrated between the antenna or the output from the cable television network and the TV set. Consequently, this invention is specifically limited to processing of TV signals varying up to approximately 900 MHz.

This invention proposes the same quality criteria as transmission by coaxial cable over a cable length less than 60 m, and in particular active management of the return channel (5 to 65 MHz) and the down channel (86 to 862 MHz), the signal gradient, attenuations, the noise factor, the difference between the modulation peak of two carriers <3 db, radiation, making the signal symmetric or asymmetric, impedance and order 2 or 3 intermodulation.

Apart from the transmission of TV signals, it is known how to use coaxial cables in association with or in combination with cables of twisted wire pairs. It is known that an impedance transformer, more frequently known as a balun, can be used to connect a coaxial cable to a cable consisting of twisted pairs, the balun performing an impedance matching function by making an end to end connection between two cables with different characteristic impedances without introducing any signal degradation phenomena related to a change in impedance.

A technology consisting of converting base band signals and broadcasting them through a switching rack is an expensive practice that does not enable the complete transparency of coaxial transmission technologies and twisted pair technologies expected by users.

This technology is described in document U.S. Pat. No. 5,130,793. It is based on the physical principle of converting frequencies to "base band" (12 MHz for video) to make long lengths possible and to eliminate impedance and radiation problems. A switch installed at the input to the installation receives information from the user and switches the channel required by the user. This system can cover distances of up to 500 m and is firstly very expensive, it requires a permanent operator and is absolutely not transparent, for example for a cable operator.

Twisted pair cables are the cables most frequently used for wiring or pre-wiring of building, for making connections and for home automation. Twisted pair cables are used for the transmission of very low voltage signals for a wide variety of uses such as telephony, data processing, automation, alarm, sound systems, video in base band, etc. Office buildings and even home are also increasingly frequently pre-wired with a pre-wired low current network using twisted pair cables.

Passing a video signal in a twisted pair at low cost is simple if the only problem to be solved is the impedance problem, and if the frequency is limited. This can be done using a balun that is a passive and reversible element, as described in U.S. Pat. No. 5,950,111. Thus, this document describes a solution using a following connection system including a coaxial input, coaxial connector, 75 100 → ohms balun, twisted pair connector (beginning of line).

This solution does not take account of the electrical characteristics of the input signal compared with the output level. Therefore, this processing has to be done on the output side.

The purpose of the distribution system according to this invention is to use a previously installed very low voltage network for the transmission of TV signals output from a coaxial cable.

To achieve this, this invention proposes a system for the distribution of television (TV) type video signals comprising a coaxial input cable adapted for connection to a TV antenna or to a cable television network and with a frequency band of up to about 900 MHz, a coaxial output cable adapted for connection to a television set, characterised in that it also comprises a first input processing unit comprising a coaxial input terminal, at least one low current terminal for twisted wire pairs and processing means for processing TV signals output from the coaxial cable so as to transform them into signals with substantially the same transmission characteristics on the same frequency band and that can be transmitted for a twisted wires pair, at least one second output processing unit comprising a low current input port for twisted wire pairs, a coaxial output terminal and processing means for processing signals output from a twisted wires pair connected to the first input processing unit so as to transform them into signals substantially identical to the signals output from the said coaxial cable, and at least one connecting cable consisting of twisted wire pairs connecting the first processing unit to the second processing unit. Thus, the twisted pair cables that connect the two processing units can be passed through a previously installed low current network that may, for example, include a cross connect assembly. The TV signals can thus be transported on the previously installed low current network that extends into all rooms in the pre-wired premises. Consequently, a TV set can be installed in any room simply by connecting its antenna cable to the coaxial terminal of the second processing unit that is connected to the low current network; the TV signal can thus be transmitted through this low current network as far as the TV set. On the input side, the coaxial cable originating from the antenna or the cabled network is connected to the input terminal of the first processing unit that is connected to the previously installed low current network using twisted wires while maintaining qualitative criteria essential for standard reception as described above.

According to one advantageous characteristic of the invention, the first input processing unit comprises means of cutting off the signal transmission in the case in which a cable consisting of twisted wire pairs is not connected to the low current output terminal of the first input processing unit. Advantageously, the low current output terminal of the first input processing unit comprises means of detecting the presence of a low voltage connector connected to the twisted wires cable plugged into the said output terminal.

As a variant or in addition, the first input processing unit comprises means of cutting off the signal transmission in the case in which a coaxial cable is not connected to the coaxial output terminal of the second input processing unit. Advantageously, the coaxial output terminal of the second output processing unit comprises means of detecting the presence of a low voltage connector connected to an output coaxial cable and plugged into the said coaxial output terminal. Preferably, one twisted wires pair in the said connecting cable acts as a loop back line between the second and the first processing unit to transmit a connector present or absent signal to the cut-off means.

This avoids the output terminal of the first processing unit or the output terminal of the second processing unit from producing strong radiation, and consequently inducing electromagnetic fields that may cause disturbances or degrade television reception by applications located in the neighbourhood. If these signal transmission cut-off means are not present, and if there are no TV sets connected to this distribution system according to the invention, TV signals output from the antenna or the cabled network would be transmitted as far as the output terminals of the first processing unit or the second processing unit and thus electromagnetically pollute the entire environment. These cut-off means eliminate all electromagnetic disturbances.

According to another characteristic of the invention, the first input processing unit comprises signal processing means, a cross connect and several low current output terminals for twisted wire pairs each connected to the cross connect, the cut-off means acting between the cross connect and the said output terminals so as to cut off transmission of signals between the cross connect and the output terminal for which the lack of a plugged-in connector is detected.

According to another aspect of the invention, a sub cross connect assembly is installed between the first and the second processing units, with at least one cable consisting of twisted wire pairs connecting the first processing unit to the sub-cross connect assembly, and at least one other cable consisting of twisted wire pairs connecting the sub-cross connect assembly to the second processing unit, the said second unit comprising a coaxial output terminal and at least one output terminal for twisted wire pairs. Thus, the distribution system according to the invention can be integrated into a previously installed low current network that includes a sub-cross connect assembly through which all low current electrical applications using the twisted wire pairs network can flow. Thus, this previously installed low current network can be used to transmit TV signals with no loss of transmission. All that is necessary at the output from the low current network is to set up the second processing unit which for example may be in the form of an adapter comprising a low current connector for twisted wire pairs adapted so that it can be plugged onto a low current terminal for twisted wire pairs on the said sub-cross connect assembly. The said distribution system according to the invention can then very simply be summarised as being a first input processing unit that is integrated between the cable output from the antenna or the cabled network and the cross connect assembly, to which it is connected through a single cable consisting of twisted wire pairs, and a second processing unit in the form of an adapter plugged into an output terminal of the sub-cross connect assembly in the previously installed low current network. All that is necessary then is to connect the coaxial cable from the TV set onto the coaxial output terminal of the second adapter processing unit.

According to another characteristic of the invention, the twisted wires pair that transmits the transformed TV signals is shielded. For example, a cable composed of four twisted wire pairs could be used, in which one pair is a very high performance "high speed" pair for transporting video signals and physically has a slightly larger cross section.

This invention also defines a TV signal processing unit with a frequency band of up to about 900 MHz, comprising a coaxial input terminal, processing means for transforming TV signals from the input terminal into signals with substantially the same transmission characteristics on the same frequency band and that can be transmitted on a twisted wires pair, and at least one output terminal for twisted wire pairs, characterised in that it also comprises means of cutting off the signal transmission acting on the input side of output terminals to cut off the signal transmission at an output terminal that is not connected indirectly, advantageously through a second output processing unit connected to the said terminal through a cable consisting of twisted wire pairs, to a coaxial cable connected to a TV set.

The invention will now be described more fully with reference to the attached drawings giving a non-limitative example of an embodiment and application of this invention.

In these Figures:

FIG. 1 shows a very diagrammatic view of a distribution system according to the invention used between a TV antenna and a TV set passing through a low current network that includes a sub-cross connect assembly, FIG. 2 also shows a diagrammatic view showing the integration of a distribution system according to the invention into low current network previously installed in premises with several rooms, and FIG. 3 shows a diagrammatic view of a second output processing unit according to the invention.

The TV signal distribution system according to the invention comprises essentially two component elements, namely a first input processing unit 1 and a second output processing unit 3. The first processing unit 1 comprises a coaxial type terminal or input port 10 into which a coaxial cable 41 will be fitted that is connected at its end either to an antenna 4 that may be a rake or dish antenna, or to a cable television network. The input terminal 10 may be made conventionally so that a conventional coaxial connector can fit into it. Secondly, the second output processing unit 3 comprises a terminal or a coaxial output port 31 into which a coaxial cable 53 will be fitted, and to which a television set 5 is connected at its end. The coaxial cables 41 and 53 used for the connection to the two processing units 1 and 3 are used for the transmission of television (TV) type signals, characteristically with an impedance of 75 ohms on a frequency band varying from 5 to 862 MHz as defined in the MABLR standard.

The TV signal distribution system according to the invention is capable of transmitting TV signals output from the coaxial cable 41 through cables consisting of twisted wire pairs for which the transmission characteristics are normally different from the characteristics of coaxial cables. To enable this transmission of TV signals, the first input processing unit 1 comprises processing means 14 for transforming or reconfiguring TV signals output from the input coaxial cable 41 so that they can be transmitted through a conventional twisted wires pair without loss of transmission and with the qualitative criteria mentioned above. To achieve this, the processing means 14 readapt the characteristic impedance of the coaxial cable equal to 75 ohms, to an impedance of 100 or 120 ohms. The TV signals are made symmetric, amplified, and the gradient is pre-adjusted on some frequency band ranges to compensate for transmission losses in the cable consisting of twisted wire pairs. Thus, at the output from the processing means 14, TV signals have an impedance of 100 to 120 ohms over a frequency band also varying from 5 to 65 MHz for the return channel and 86 to 862 MHz for the down channel. TV signals output from the coaxial input cable 41 may then be injected with no loss of transmission on a conventional twisted wires pair.

The first processing unit 1 also comprises one or several low current output terminals for cables consisting of twisted wire pairs. In the remainder of the description, these low current output terminals will be referred to as RJ 45 terminals, although other types of low current terminals may be used. One or several cables 12 consisting of twisted wire pairs may thus be connected to the first input processing unit 1. For the moment, we will assume that the processing unit 1 only includes a single RJ 45 terminal for connecting a single cable 12 consisting of twisted wire pairs.

The twisted pairs cable 12 may be directly connected to the second output processing unit 3, although this is not shown in the Figures. There is no particular advantage in this, but we will start by explaining the embodiment of this invention in this way for reasons of simplicity.

Thus, TV signals transformed by the first input processing unit 1 are transmitted to the second output processing unit 3 through a cable 12 consisting of twisted wire pairs. This second output processing unit comprises processing means 34, advantageously balun type passive means that once again process the TV signals transformed into TV signals that can be transmitted again through a coaxial cable 53 connected to the TV set 5. The processing means 34 once again adapt the impedance to 75 ohms, making the signal asymmetric while maintaining efficient transmission over the frequency band varying from 5 to 65 MHz for the return channel and 86 to 862 MHz for the down channel. In summary, TV signals at the output from the processing means 34 are nearly or perfectly identical to those transmitted by the input coaxial cable 41 connected to the antenna or the cable television network.

In practice, the processing means 14 and 34 integrated into the first processing unit 1 and the second processing unit 2 respectively, may be conventional impedance transformers more frequently known as baluns. Baluns are conventionally in the form of connectors used to connect a symmetric cable (twisted pairs) to an asymmetric cable (coaxial cable). They are capable of impedance matching to connect two cables with different characteristic impedances end to end, while avoiding any signal degradation phenomena.

Therefore the distribution system according to this invention provides a means of carrying conventional TV signals output from a coaxial cable to conventional cables consisting of twisted wire pairs. It is thus possible to make TV signals output from a coaxial cable flow through a low current network using cables consisting of twisted wire pairs. Buildings or other premises are more and more frequently being pre-wired, particularly office buildings, with a low current network on which a large number of interfaces can be connected such as a telephone, a computer, a modem, a fax, an alarm, a sound system (HIFI), an automatic door opening system, an interphone, etc. This type of low current network is now also installed in private homes. The advantage of this type of pre-wired low current network is that it extends in all rooms in the premises or the home, such that information can very easily be transmitted into any room.

Up to now, when it was required to install a TV set connected to an antenna or the cabled network, it was necessary to install a new coaxial cable from the antenna or from a splitter box as far as the new TV set. This takes time and is often not very aesthetic since it is difficult to integrate the new coaxial cable in the floor or partitions.

This system of distributing TV signals according to the invention provides a means of using the previously installed low current network to transfer TV signals from the initially installed coaxial cable and connect it to the antenna or the cabled network as far as the TV set. In fact the very simplistic example that we have described above only uses a single cable consisting of twisted wire pairs 12 connecting the two processing units according to the invention. However, it would be quite possible to replace this single cable by a more complex cable routing passing through a previously installed low current network. In general, such a low current network comprises at least one sub-cross connect 2 for cross connection of twisted pair cables. This sub-cross connect 2 is conventionally in the form of a panel 20 defining several low current terminals 21, for example RJ 45 type, on its front face. Other cables consisting of twisted wire pairs may be connected to the back of the panel 20. This sub-cross connect 2 provides a practical means of collecting all information transmitted through the low current network so that it can be distributed to the various rooms in the pre-wired premises. With reference to FIG. 2 it can be seen that an audio or video door opener, a wire alarm, or automations can be connected on the sub-cross connect 2 that sends signal to output terminals 24 to which an appropriate control device can be connected.

With reference to FIG. 1, we will very schematically explain how to use a distribution system according to the invention in combination with a conventional low current network including a sub-cross connect 2. For example, the input processing unit 1 may be connected to the cell 3 of the sub-cross connect 2 using a cable consisting of twisted wire pairs 12. To achieve this, the cable 12 may include a connector 18 adapted to be plugged into the low current terminal 11 of the input processing unit 1. Another cable 23 consisting of twisted wire pairs is connected to the cell 3 of the sub-cross connect 2 so as to make electrical contact with the cable 12. This cable 23 is then connected to the second processing unit 3. The second processing unit 3 may for example be located in a room in the pre-wired premises, for example a bedroom in a home. Thus, it can be seen that it is very simple to connect the distribution system according to the invention to a previously installed low current network, simply using two cables 12 and 23 consisting of twisted wire pairs. More precisely, the TV signals are only transmitted through one twisted wires pair in cables 12 and 23. A "high speed" pair with a larger cross section and provided with electromagnetic shielding can be used to improve transmission at these high frequencies (5 to 862 MHz).

The second processing unit 3 may be directly integrated into a cross connect box or a baseboard in the room in the premises. In this case, the cable 23 connects the second processing unit 3 directly. Considering that the transmission of TV signals only uses a single cable pair 23, whereas this cable is conventionally composed of four twisted wire pairs, some pairs remain unused. Consequently, these unused pairs may be used for the transmission of other signal types, for example telephone or computer. Consequently, it is advantageous if the second processing unit 3 also includes one or several low current output terminals, for example of the RJ 45 type, in addition to the coaxial output terminal 31. Thus, a conventional interface may be connected to the second processing unit 3 using a conventional cable consisting of twisted wire pairs. This is exactly what can be seen in FIG. 1, in which the processing unit 3 is directly connected to the cable 23 and includes one coaxial output 31 and one output for twisted pairs 32.

Advantageously, the distribution system according to the invention can also be used for distribution or division of TV signals so that several TV sets 5 can be connected. To achieve this, the first input processing unit 1 comprises a cross connect 15 arranged at the output from the processing unit 14. The cross connect 15 duplicates TV signals so as to provide several TV signal outputs with the same characteristics as the TV signals at the output from the processing unit 14. Each cross connect output 15 is connected to a low current output terminal 11, for example of the RJ 45 type as can be seen in the two FIGS. 1 and 2. There are two outputs 11 in FIG. 1, while there are four outputs 11 in FIG. 2. Therefore the processing unit 1 in FIG. 1 can be used to connect two TV sets, while the unit in FIG. 2 can be used to connect four TV sets 5.

With reference to FIG. 1, the Figure shows that a TV set 5 is connected to a second output processing unit 3 itself connected through cables 23 and 12 to the first input processing unit 1. On the other hand, the second output processing unit 3 is free. Therefore, TV signals are transmitted as far as the coaxial output terminal 31 that consequently emits intense electromagnetic radiation over a wide frequency band. This radiation is severely parasiting and consequently can strongly disturb the environment.

According to the invention, the TV signal transmission cut-off means are provided at the first input processing unit 1, and are marked as numeric reference 16. These cut-off means are integrated between the cross connect 15 and the low current output terminals 11. These cut-off means 16 interrupt the transmission in the case in which there is no cable 12 connected to the output terminals 11. To achieve this, each terminal 11 is equipped with a presence sensor 17 that sends a detection signal to the cut-off means 16 if no cable 12 is connected to the output terminals 11. Obviously, the cut-off means 16 only interrupt the transmission to the terminal 11 if no appropriate connector 18 is detected. The detection signal is transmitted to the cut-off means 16 by a simple loop back.

As a variant, or preferably in addition, the cut-off means 16 also act by cutting off the transmission of TV signals between the cross connect 15 and the terminals 11 in the case in which there is no appropriate connector 52 connected to a cable 53 connected to a TV set 5, plugged into one of the coaxial output terminals 31. Similarly, it is detected if there is no connection of an appropriate connector 53 on the coaxial terminal 31 by means of an appropriate presence detector 35 that sends a detection signal to the cut-off means 16 through cables 23 and 12 consisting of twisted wire pairs. This is also done by a loop back. Thus, if no connector is plugged into the coaxial output terminal 31, as is the case for the output processing unit 3 at the left in FIG. 1, the presence detector 35 detects the absence of this connector and sends a detection signal to the cut-off means 16 through one of the twisted wire pairs 23 and 12.

This thus avoids pollution of the environment of the first processing unit 1 at terminals 11 and of the second processing unit 3 at its coaxial output terminal 31, by cutting off the transmission of TV signals.

In this case, the loop back or service line is used to return signals for detection of the second processing unit to the first processing unit 1. Obviously, this service line could be used to return other signals, for example such as control signals or video or audio signals previously modulated. The control signals may be sent by a universal remote control that sends a control signal, for example a read signal, to a video or audio signals source, such as a VCR, a DVD player, a camera, a satellite terminal, a HIFI system, etc. In return the signals may be sent by these internal or external sources that will inject their signals onto the service line after modulation. The modulator may be installed between the terminal 32 and the connector 33. We can thus talk about a service network and a distribution network, both of which are formed by the previously installed low current network C consisting of twisted pairs.

We will now refer to FIG. 2 to explain a variant embodiment at the output processing unit 3. In FIG. 2, several rooms (four in this case) can be seen each equipped with different equipment such a telephone, an interphone, a videophone, a computer or a TV set. The low current network also includes a sub-cross connect 2 that connects several output terminals located in different rooms by means of cables consisting of twisted wire pairs, for example at the cross connect box or baseboard. The first input processing unit 1 is connected to the sub-cross connect 2 in the same way as the embodiment shown in FIG. 1, in other words using cables 12 consisting of twisted wire pairs. The input unit 1 also comprises two coaxial input terminals 10 for connection to an antenna or a cabled network. Several interfaces may also be connected to the sub-cross connect 2 directly at its terminals 21; for example a door opening system could be connected to it equipped with an audio or video monitoring system, a wire alarm, computers, etc. On the other hand, the second processing unit 3 is not directly connected to the cable 23, but is in the form of an adapter that could be connected to the output terminals 24 forming part of the previously installed low current network. To achieve this, as can be seen in FIG. 3, the adapter 3 comprises a low current connector 33 that can be inserted in the low current terminal 24, for example of the RJ 45 type. Two twisted wire pairs are connected to the coaxial output terminal 31, one for the transmission of TV signals, and one for the return transmission of a signal identifying detection of the absence or presence of a connector 52. The other two unused twisted wire pairs are connected directly to a low current output terminal 32, for example of the RJ 45 type. Obviously, the TV signals are processed at the processing means 34 that may be a balun before being sent to the coaxial output terminal 31. Therefore, firstly this adapter 3 enables the transformation of TV signals for the twisted wires pair carrying the TV signals, and secondly simply transfers the low current signals for the wire pairs not used by TV signals. As can be seen in FIG. 2, a TV set 5 may be connected to the coaxial terminal 31 of the adapter 3 and a telephone may also be connected to the low current terminal 32 of the adapter 3. In this case, in other words with an output processing unit 3 in the form of a plug-in adapter, it is very easy to implement the distribution system according to the invention simply by including the first input processing unit 1 between the coaxial cable output from the antenna and the sub-cross connect 2 of the previously installed low current network and connecting the adapter/second output processing unit 3 onto one of the output terminals 24 of the previously installed low current network. Thus, it is very easy to install a TV set 5 in any room in the premises in which there is a previously installed pre-wired low current network. This distribution system is very efficient on all types of low current networks if the length of the cables consisting of twisted wire pairs is not more than approximately 60 meters, which includes all homes.

With the distribution system according to the invention, TV signals can be routed on a previously installed low current network of cables consisting of twisted wires pair, while enabling distribution/duplication of TV signals, and while minimising electromagnetic pollution without restricting the capacities of the previously installed low current network. Note also that it is very easy to install the distribution system according to the invention.

The invention claimed is:

1. System for the distribution of television (TV) type video signals with a frequency band of up to about 5 to 900 MHz, the said system comprising:
    an input coaxial cable (41) adapted for connection to a TV antenna (4) or to a cable television network,
    an output coaxial cable (53) adapted for connection to a television set (5), characterised in that it also comprises:
    a first input processing unit (1) comprising a coaxial input terminal (10), at least one low current terminal (11) for twisted wire pairs and processing means (14) for processing TV signals output from the input coaxial cable so as to transform them into signals with substantially the same transmission characteristics on the same frequency band on a twisted wires pair, at least one second output processing unit (3) comprising a low current input port (33) for twisted wire pairs, a coaxial output terminal (31) and processing means (34) for processing signals output from a twisted wires pair (12) connected to the first input processing unit (1) so as to transform them into signals substantially identical to the signals output from the said input coaxial cable (41), and at least one connecting cable (12, 23) consisting of twisted wire pairs connecting the first processing unit (1) to the second processing unit (3), wherein the first input processing unit (1) comprises means of cutting off (16) the signal transmission in the case in which a coaxial cable (53) is not connected to the coaxial output terminal (31) of the second output processing unit (3).

2. System according to claim 1, in which the first input processing unit (1) comprises means of cutting off (16) the signal transmission in the case in which a cable consisting of twisted wire pairs (12) is not connected to the low current output terminal (11) of the first input processing unit (1).

3. System according to claim 2, in which the low current output terminal (11) of the first input processing unit (1) comprises means of detecting the presence (17) of a low voltage connector (18) connected to the twisted wires cable (12) and plugged into the said output terminal (11).

4. System according to claim 1, in which the coaxial output terminal (31) of the second output processing unit comprises means of detecting the presence (35) of a low voltage connector (52) connected to an output coaxial cable (53) and plugged into the said coaxial output terminal (31).

5. System according to claim 1, in which one twisted wires pair in the said connecting cable acts as a loop back line between the second (3) and the first (1) processing unit to transmit a connector present or absent signal to the cut-off means (16).

6. System according to claim 2, in which the first input processing unit (1) comprises signal processing means (14), a cross connect (15) and several low current output terminals (11) for twisted wire pairs each connected to the cross connect (15), the cut-off means (16) acting between the cross connect (15) and the said output terminals (11) so as to cut off transmission of signals between the cross connect and the output terminal for which the lack of a plugged-in connector (18) is detected.

7. System according to claim 1, in which a sub-cross connect assembly (2) is installed between the first (1) and the second (3) processing units, with at least one cable consisting of twisted wire pairs (12) connecting the first processing unit (1) to the sub-cross connect assembly (2), and at least one other cable consisting of twisted wire pairs (23) connecting the sub-cross connect assembly (2) to the second processing unit (3), the said second unit (3) comprising a coaxial output terminal (31) and at least one output terminal (32) for twisted wire pairs.

8. System according to claim 7, in which the second processing unit (3) is in the form of an adapter comprising a low current connector for twisted wire pairs (33) adapted so that it can be plugged onto a low current terminal (24) for twisted wire pairs connected to the said sub-cross connect assembly (2) for a cable consisting of twisted wire pairs (23).

9. System according to claim 1, in which the twisted wires pair that transmits the transformed TV signals is shielded.

10. System according to claim 1, in which the first input processing unit is an active unit comprising active processing means.

11. System according to claim 10, in which the active processing means comprise an amplification stage (14).

12. System according to claim 1, in which the processing means of the second processing unit comprise passive means such as a balun.

13. System according to claim 1, in which the second processing unit is provided with a low current terminal (32) connected to the input port (33) through a modulator to route signals on a loop back twisted pair.

14. TV signals processing unit (1) with a frequency band varying from 5 to 65 MHz for the return channel and 86 to 862 MHz for the down channel, the said processing unit comprising a coaxial input terminal (10), processing means (14) for transforming TV signals output from the input terminal in signals with substantially the same transmission characteristics on the same frequency band and that can be transmitted for a twisted wires pair, and at least one output terminal (11) for twisted wire pairs, characterised in that it also comprises means of cutting off (16) the signal transmission acting on the input side of output terminals (11) to cut off the signal transmission at an output terminal that is not connected indirectly, advantageously through a second output processing unit (3) connected to the said terminal through a cable consisting of twisted wire pairs, to a coaxial cable (53) connected to a TV set (5).

15. A system for distributing video signals, comprising:
a first input processing unit comprising a coaxial input terminal and at least one twisted wire pair output terminal;
at least one second output processing unit comprising a twisted wire pair input terminal and a coaxial output terminal;
an input coaxial cable connected to the coaxial input terminal of the first input processing unit;
an output coaxial cable connected to the coaxial output terminal of the second output processing unit; and
at least one twisted wire pair cable connecting the first input processing unit to the second output processing unit,
wherein:
the first input processing unit transforms signals from the input coaxial cable into signals on the twisted wire pair cable;
the second output processing unit transforms signals from the twisted wire pair cable into signals on the output coaxial cable; and
the first input processing unit comprises means of cutting off signal transmission when a coaxial cable is not connected to the coaxial output terminal of the second output processing unit.

16. The system for distributing video signals of claim 15, wherein the first input processing unit is an active unit.

17. The system for distributing video signals of claim 16, wherein the first input processing unit further comprises an amplification stage.

18. The system for distributing video signals of claim 15, wherein the system is capable of distributing video signals with a frequency band of up to about 900 MHz.

* * * * *